United States Patent
Hagisato et al.

(10) Patent No.: US 7,656,423 B2
(45) Date of Patent: Feb. 2, 2010

(54) IMAGING DEVICE AND VISUAL RECOGNITION SUPPORT SYSTEM EMPLOYING IMAGING DEVICE

(75) Inventors: Yasuo Hagisato, Susono (JP); Shinya Kawamata, Gotenba (JP); Ryuji Yamaguchi, Mishima (JP); Hidetoshi Mimura, Yokohama (JP); Tsuyoshi Kumasaka, Zama (JP)

(73) Assignees: Toyota Jidosha Kabushiki Kaisha, Toyota (JP); Matsushita Electric Industrial Co., Ltd., Kadoma (JP)

( * ) Notice: Subject to any disclaimer, the term of this patent is extended or adjusted under 35 U.S.C. 154(b) by 870 days.

(21) Appl. No.: 10/638,369

(22) Filed: Aug. 12, 2003

(65) Prior Publication Data

US 2004/0042683 A1 Mar. 4, 2004

(30) Foreign Application Priority Data

Aug. 30, 2002 (JP) ............................. 2002-253783

(51) Int. Cl.
*H04N 7/18* (2006.01)
*H04N 17/00* (2006.01)
*H04N 17/02* (2006.01)
*H04N 5/235* (2006.01)

(52) U.S. Cl. ................ 348/148; 348/187; 348/229.1
(58) Field of Classification Search .............. 348/217.1, 348/148, 187, 188, 223.1, 254–256, 229.1
See application file for complete search history.

(56) References Cited

U.S. PATENT DOCUMENTS

| 4,911,552 | A | * | 3/1990 | Kurashige et al. ........ 348/224.1 |
| 5,003,394 | A | * | 3/1991 | Lagoni ........................ 348/673 |
| 5,737,018 | A | * | 4/1998 | Shimizu et al. ............. 348/363 |
| 6,249,317 | B1 | * | 6/2001 | Hashimoto et al. .......... 348/364 |
| 6,498,620 | B2 | * | 12/2002 | Schofield et al. ............ 348/148 |
| 6,614,475 | B1 | * | 9/2003 | Yamaga et al. .............. 348/254 |
| 6,914,630 | B2 | * | 7/2005 | Nakamura ................... 348/296 |
| 2002/0067413 | A1 | | 6/2002 | McNamara |
| 2002/0118282 | A1 | * | 8/2002 | Nakamura ................... 348/148 |
| 2006/0007324 | A1 | * | 1/2006 | Takei ....................... 348/223.1 |
| 2006/0287826 | A1 | * | 12/2006 | Shimizu et al. ............. 701/216 |

FOREIGN PATENT DOCUMENTS

DE 40 15 927 A1 11/1990

(Continued)

OTHER PUBLICATIONS

U.S. Appl. No. 10/370,701, filed Feb. 24, 2003, Hara et al.

(Continued)

*Primary Examiner*—Sinh Tran
*Assistant Examiner*—Albert H Cutler
(74) *Attorney, Agent, or Firm*—Oliff & Berridge, PLC

(57) ABSTRACT

An imaging device stores and photoelectric-converts incoming light from an object of which an image is to be captured with a CCD, and controls an output level of a picture signal obtained by signal processing an image signal output from the CCD. An output adjustment value of the picture signal in the output control is set to become 50 to 70 IRE according to a peak value of the picture signal when a test pattern is captured under standard conditions. Accordingly, it is possible to have a typical imaging device display a captured image darker, and thus enable imaging suitable for nighttime imaging and the like.

12 Claims, 13 Drawing Sheets

FOREIGN PATENT DOCUMENTS

| | | |
|---|---|---|
| EP | 0 547 325 A2 | 6/1993 |
| EP | 0 707 424 B1 | 4/1996 |
| EP | 0 986 913 B1 | 3/2000 |
| GB | 2 233 530 A | 1/1991 |
| JP | A-59-172885 | 9/1984 |
| JP | A-04-345379 | 12/1992 |
| JP | A-05-021778 | 1/1993 |
| JP | A 5-56341 | 3/1993 |
| JP | 2000-270266 * | 9/2000 |
| JP | A-2000-270266 | 9/2000 |

OTHER PUBLICATIONS

McGinty, Gerald P. "Video Cameras: Operation and Servicing." Howard W. Sams & Co., Inc., 1984, ISBN 0-672-22382-1, pp. 39-64, p. 148, pp. 173-179 and 209-223.

* cited by examiner

F I G. 3
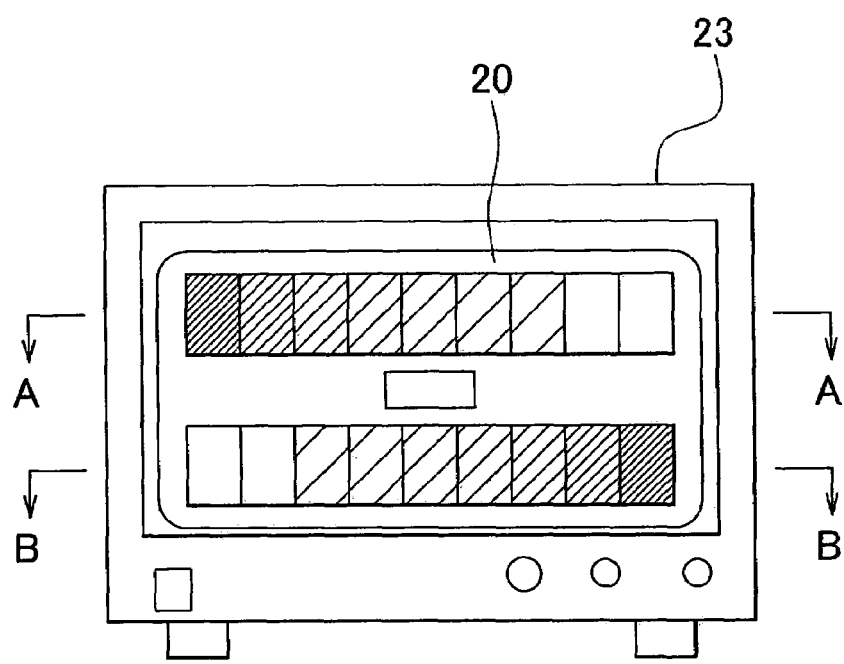

F I G. 5
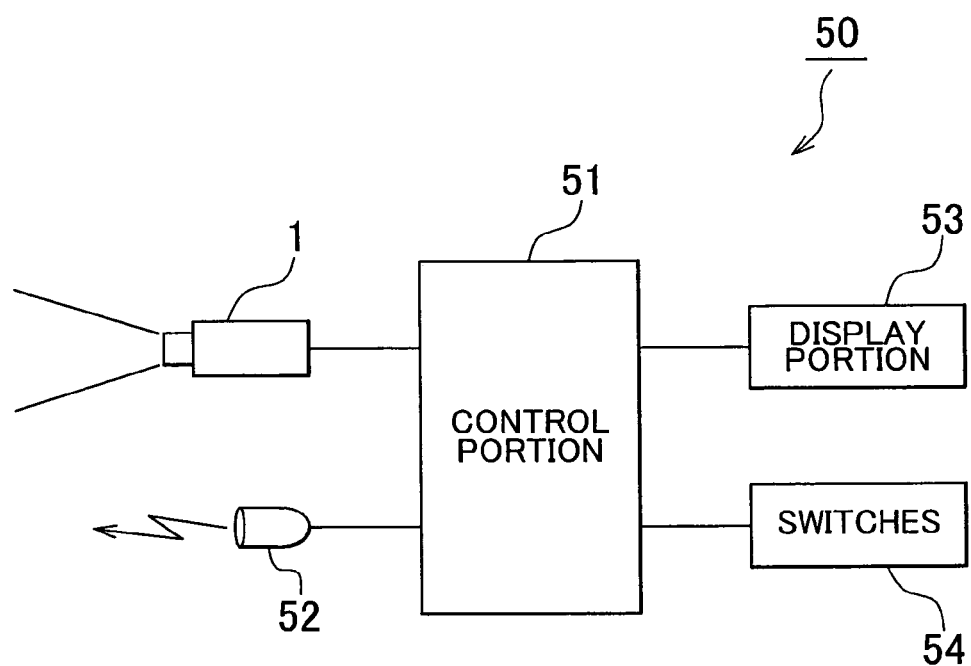

IMAGING DEVICE AND VISUAL RECOGNITION SUPPORT SYSTEM EMPLOYING IMAGING DEVICE

INCORPORATION BY REFERENCE

The disclosure of Japanese Patent Application No. 2002-253783 filed on Aug. 30, 2002, including the specification, drawings and abstract is incorporated herein by reference in its entirety.

BACKGROUND OF THE INVENTION

1. Field of the Invention

The invention relates to an imaging device suitable for nighttime imaging and the like, as well as a visual recognition support system employing device thereof.

2. Description of the Related Art

JPA 5-56341 discloses an example of a known imaging device which uses a CCD to photoelectric-convert and output light coming in through an imaging optical system. This imaging device controls the amount of light transmitted to the image optical system and the light storage time of an image pickup device, as well as variably controls the gain of the image pickup device output. In a predetermined imaging mode, the imaging device increases the gain to shorten the setting of the light storage time in an attempt to realize optimal exposure control regardless of the imaging situation.

However, with this imaging device problems, such as halation being generated in the image display, may arise depending on the conditions in which the image is captured (i.e., the imaging conditions). For example, when the imaging device is used in a visual recognition support system which provides a driver with visual recognition support when driving a vehicle at night, the image output is set high in order to enable the driver to recognize pedestrians and the like on the road in front of the vehicle when it is dark. However, when the image output is set in this way and the imaging device picks up headlights from an oncoming vehicle, for example, there is a large halation effect such that suitable imaging can not be obtained.

SUMMARY OF THE INVENTION

In view of the foregoing problems, the invention thus provides an imaging device capable of suitable imaging corresponding to the imaging conditions.

According to a first aspect of the invention, an imaging device includes an image pickup device which stores and photoelectric-converts incoming light from an object of which an image is to be captured, and an output control device which controls an output level of a picture signal obtained by signal processing an image signal output from the image pickup device. The output control device controls the output of a peak value of the picture signal when a predetermined test pattern is captured under a standard condition such that the peak value becomes 50 to 70 IRE.

In this imaging device, the output control device preferably controls the output level of the picture signal by changing a light storage time of the image pickup device based on the image signal.

According to this first aspect, keeping the picture output low by adjusting the output of the peak value of the picture signal when the predetermined test pattern is captured under standard conditions so that it becomes 50 to 70 IRE enables visibility of people and the like in the image display to be maintained and halation when strong light is input to be reduced.

According to a second aspect of the invention, an imaging device includes an image pickup device which stores and photoelectric-converts incoming light from an object of which an image is to be captured, and an output control device which controls an output level of a picture signal obtained by signal processing an image signal output from the image pickup device. When a peak value of a signal wave of the picture signal exceeds a predetermined value, the output control device controls the output level of the picture signal such that a peak value of the picture signal matches the predetermined value.

It is preferable that the output control device according to the second aspect control the output level of the picture signal by adjusting a gain of an amplifier that amplifies the picture signal.

According to this second aspect, controlling the output level of the picture signal so that the peak value of the signal wave of the picture signal does not exceed a predetermined value prevents the image display from being excessively bright when a strong light is input.

According to a third aspect of the invention, an imaging device includes an image pickup device which stores and photoelectric-converts incoming light from an object of which an image is to be captured, an output control device which controls an output level of a picture signal obtained by signal processing an image signal output from the image pickup device, and an illumination intensity detecting device which detects an illumination intensity of the incoming light. The output control device changes a control target value of the output level based on detection results of the illumination intensity detecting device and controls the output level of a captured image from the picture signal so that the captured image becomes less than a predetermined value of luminance.

It is preferable that the output control device according to the third aspect control the output level of the picture signal by changing the control target value relating to a bias voltage of the image pickup device.

According to the third aspect, by detecting the illumination intensity of incoming light with the illumination detecting device, changing the control target value of the output level of the picture signal based on that detection result, and preventing the image display from becoming as bright or brighter than a predetermined value, it is possible to change the control target value instantaneously when a strong incoming light is input and thus prevent the image display from being excessively bright.

Further, it is preferable to use the foregoing imaging devices in a visual recognition support system which provides visual recognition support to a driver when driving a vehicle at night. In this case, as imaging means for the visual recognition support system when driving a vehicle at night where the imaging conditions changes greatly, the imaging devices enable suitable imaging as well as an appropriate image display to be obtained with the visual recognition support system.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 3 is a view illustrating a test pattern used in the output adjustment shown in FIG. 2;

FIG. 5 is a block diagram of a visual recognition support system that uses the imaging device shown in FIG. 1;

DETAILED DESCRIPTION OF THE PREFERRED EMBODIMENTS

Figure 1:
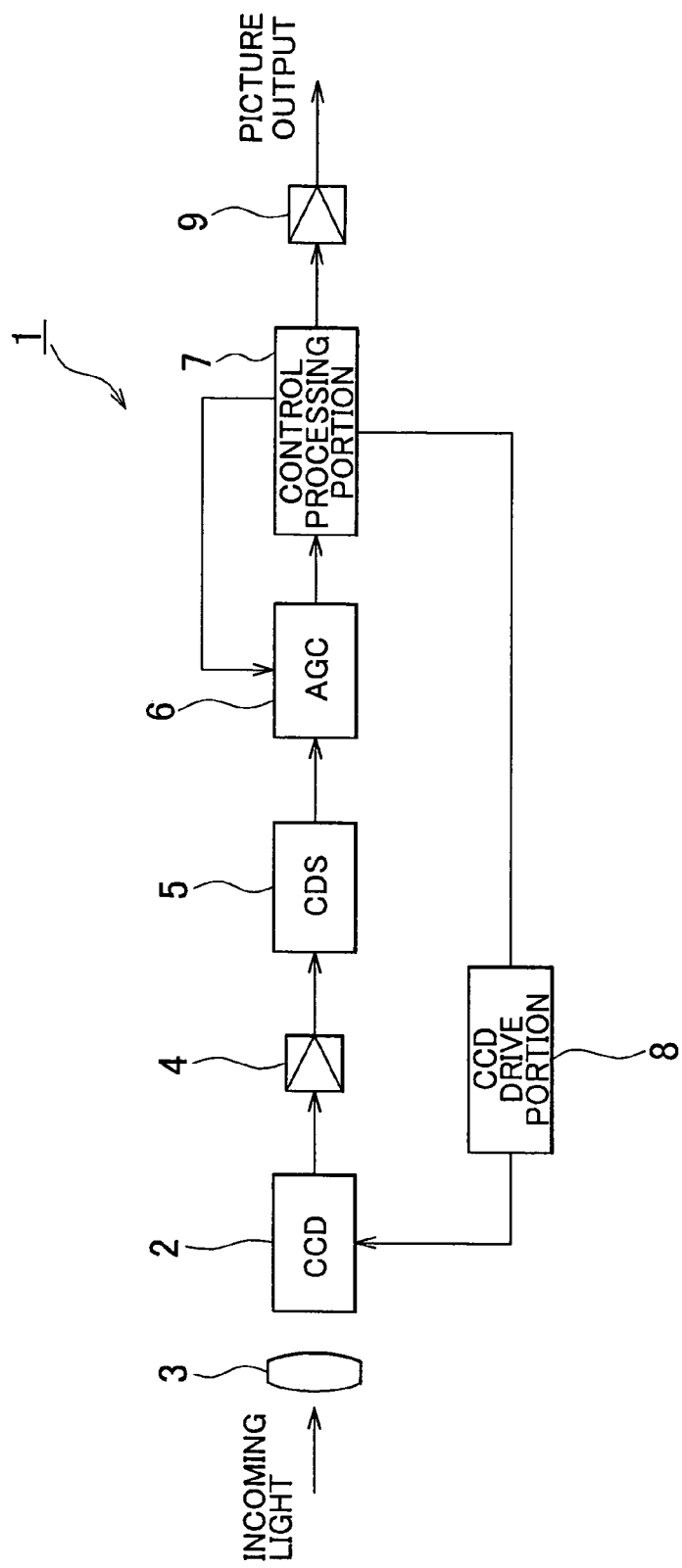
FIG. 1 is a block diagram of an imaging device according to a first exemplary embodiment of the invention.

Hereinafter, exemplary embodiments of the invention will be described in detail with reference to the appended drawings. Members in one exemplary embodiment that are the same those in another exemplary embodiment are denoted with the same reference numerals and characters throughout, and descriptions thereof are omitted.

First Exemplary Embodiment

FIG. 1 is a block diagram schematically showing an imaging device according to a first exemplary embodiment of the invention.

As shown in the drawing, the imaging device 1 according to this exemplary embodiment is provided with a CCD 2. This CCD 2 is an image pickup device that stores and photoelectric-converts incoming light from an object of which an image is to be captured. An imaging optical system 3 is mounted in the front of the CCD 2. This imaging optical system 3 is made up of a set of camera lenses, a visible light cutting filter and the like. Providing the imaging optical system 3 with the visible light cutting filter enables the CCD 2 to be sensitive to near-infrared light. The incoming light, which is the input image, passes through the imaging optical system 3 and hits the CCD 2.

On the output side of the CCD 2 is provided, in order, an amplifier 4, a CDS (Correlated Double Sampling) 5, and an AGC (Auto Gain Control) 6. The amplifier 4 is an analog amplifier that amplifies an image signal of the CCD 2. The CDS 5 is a correlated double sampling circuit that reduces noise in the stored charge of the CCD 2. The AGC 6 is a circuit that automatically adjusts the gain of the image signal.

On the output side of the AGC 6 is provided a control processing portion 7. This control processing portion 7 receives and processes signals output from the AGC 6, and outputs controls signals to both the AGC 6 and an CCD drive portion 8.

The CCD drive portion 8 is a CCD drive circuit that controls the storage operation, read operation, reset operation, bypass voltage and the like of the CCD 2. This CCD drive portion 8 functions as an electronic shutter that controls the exposure time, i.e., the shutter speed, of the CCD 2 by changing the storage time of the CCD 2 by changing a drive pulse and the like. An amplifier 9 is provided on the output side of the control processing portion 7. This amplifier 9 is an amplifier that amplifies a picture signal output from the control processing portion 7.

Next the output control of the imaging device 1 will be described.

In FIG. 1, the imaging device 1 controls the output level of the picture signal that is output so that it becomes a predetermined control target value. This output control is performed by the control processing portion 7 and the CCD drive portion 8.

That is, the control processing portion 7 calculates the average value of the luminance level of the entire picture of the picture signal. If that average value is larger than a preset control target value, the CCD drive portion 8 increases the shutter speed of the CCD 2 to shorten the exposure time. If that average value is smaller than the preset control target value, the CCD drive portion 8 decreases the shutter speed of the CCD 2 to increase the exposure time.

This type of output control enables a uniform picture signal to be output even if the brightness of the object of which an image is to be taken changes.

Next, the output adjustment in the imaging device 1 will be described.

Figure 2:
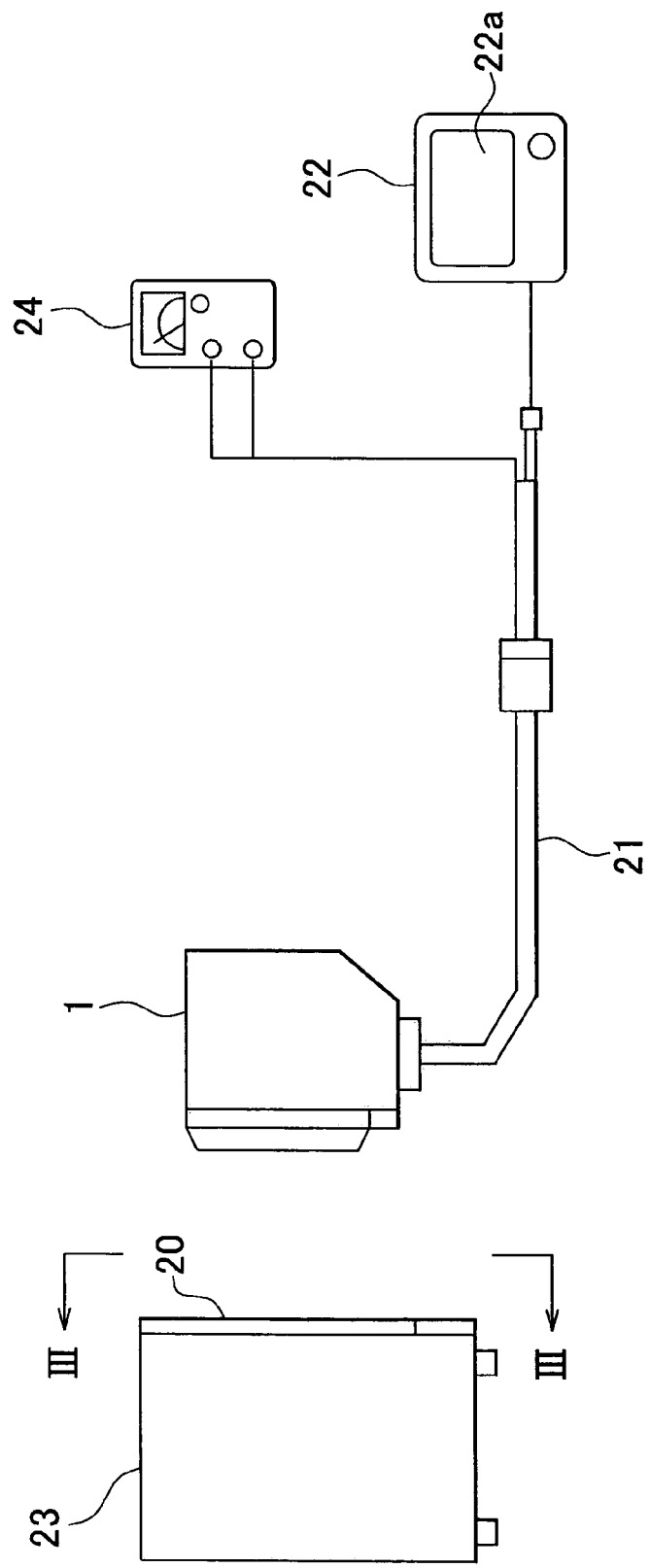
FIG. 2 is a view illustrating output adjustment in the imaging device shown in FIG. 1.
Figure 4:
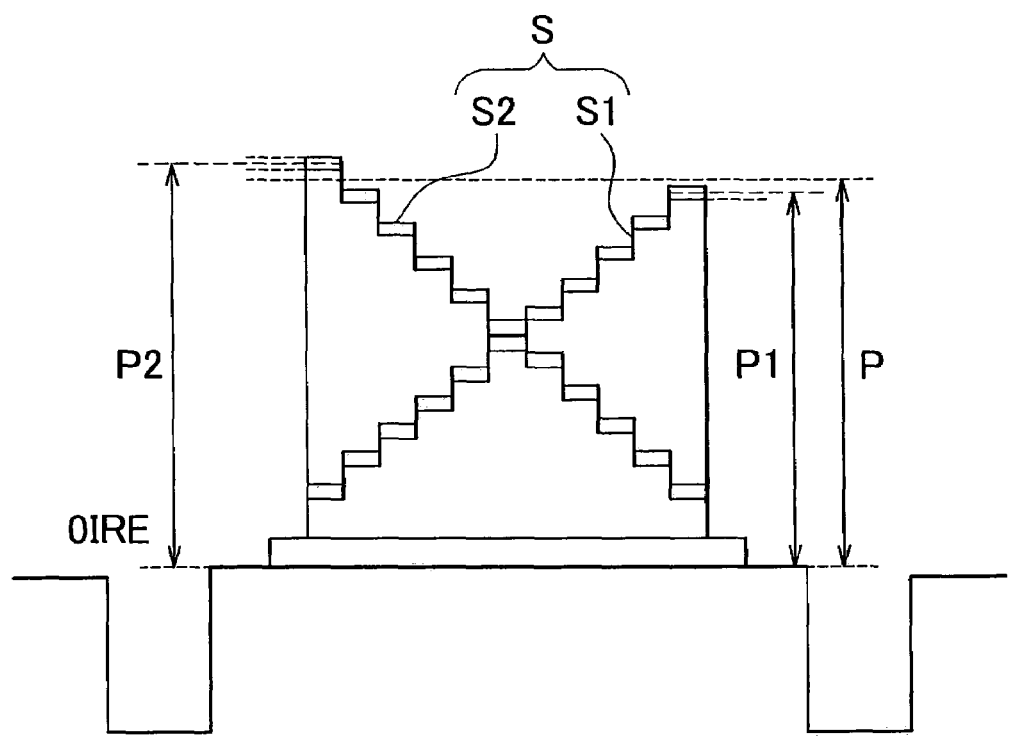
FIG. 4 is a view illustrating a picture signal in the output adjustment shown in FIG. 2.

FIG. 2 is a view illustrating output adjustment in the imaging device. FIG. 3 is a view illustrating a test pattern. FIG. 4 is a view illustrating a picture signal.

As shown in FIG. 2, the imaging device 1 adjusts the output under predetermined standard conditions. In the output adjustment by the imaging device 1, a test pattern 20 is first arranged in a position in front of the imaging device 1. A measuring device 22 is connected via a cable 21 to the output side of the imaging device 1. A power supply 24 is also connected to the imaging device 1 via the cable 21.

As shown in FIG. 3, a grayscale chart is used as the test pattern 20. For example, a transparent ITE or a type II grayscale chart ($\gamma=0.45$) may be used and attached to a chart light source 23 (Pattern Box CCV51F made by Dai Nippon Printing Co., Ltd.). A device, e.g., a synchroscope, which is able to measure the picture signal level of the captured test pattern 20 may be used as the measuring device 22.

The imaging device 1 is set in a position such that the test pattern 20 just fills the captured area of the imaging device 1. At this time, the distance between the imaging device 1 and the test pattern 20 is determined according to the characteristics of the imaging optical system 3 of the imaging device 1.

Referring to FIG. 2, a power supply 24 supplies power to the imaging device 1 to activate it. The chart light source 23 emits light having a color temperature of $5100\pm100°$ K, an illumination intensity of $2750\pm150$ LUX, and a luminance of $1050\pm50$ mt (cd/m2). At that time, the room lighting is set at 500 to 1500 LUX.

Under these kinds of standard conditions, the imaging device 1 captures the test pattern 20 and outputs the picture signal of the captured the test pattern 20 to the measuring device 22.

Referring to FIG. 4, a picture signal S of the test pattern 20 is displayed on a monitor 22a of the measuring device 22. This picture signal S is a signal in which the voltage has changed in a step-like manner according to the pattern of the test pattern 20. For example, picture signal S1 corresponding to line A-A in FIG. 3 is a signal in which the voltage increases in a step-like manner, while picture signal S2 corresponding to line B-B in FIG. 3 is a signal in which the voltage decreases in a step-like manner. For the sake of simplicity, the picture signals S1 and S2, which are originally illustrated separately, are shown overlapping one another in FIG. 4.

Next, the output of the imaging device 1 is adjusted such that the output adjustment value, i.e., a peak value (peak height value) P of the picture signal S becomes 50 to 70 IRE. The peak value P of the picture signal S is obtained by taking the average value of a peak value P1 of the picture signal S1 and a peak value P2 of the picture signal S2. Preferably, the output of the imaging device 1 is adjusted such that the peak value P of the picture signal S becomes 65±3 IRE. In a typical imaging device, the peak value of the picture output signal is set to approximately 80 IRE. In contrast, in the imaging device 1 according to this exemplary embodiment, the output is set small.

When the output of the peak value P of the picture signal S when the grayscale test pattern 20 has been input is adjusted so as to be 50 to 70 IRE, the output value of the picture signal becomes 38 to 43 IRE when white is input to the overall display. Also, when the output of the peak value P of the picture signal S is adjusted to become 65±3 IRE, the output value of the picture signal becomes 40 to 42 IRE when white is input to the overall display.

By performing output control while the output is adjusted in this way, suitable imaging which adapts sufficiently to changes in the conditions under in which imaging is performed (hereinafter referred to as "imaging conditions") is possible.

While adjustment of the output adjustment value in the imaging device 1 is done at the time of manufacture, it is preferable that the default value of the output adjustment value set at that time be 50 to 70 IRE, even if the output is adjustable by the user after the time of manufacture. If this is done, suitable imaging is possible from the first time the imaging device 1 is used so the user does not need to adjust the output.

FIG. 5 is a block diagram schematically showing a visual recognition support system 50 of a vehicle which uses the imaging device 1 according to the exemplary embodiment.

As shown in the drawing, the visual recognition support system 50 is a system which provides visual recognition support to a driver when driving at night. The visual recognition support system 50 includes the imaging device 1 as imaging means. The imaging device 1 is arranged in a position, such as on the windshield glass, so as to capture an image of an area in front of the vehicle. The imaging device 1 may be provided with a device which is sensitive to near-infrared light.

For example, a visible light cutting filter may be provided toward the front of in the imaging optical system 3 of the CCD 2 which makes it possible to form a picture centered around near-infrared elements. Near-infrared in this case refers to light having a wave-length of 780 to 1500 nm.

The output side of the imaging device 1 is connected to a control portion 51. This control portion 51 is made up, for example, of a CPU, ROM, RAM, an input signal circuit, an output signal circuit, a power circuit, and the like, and controls the overall system.

The visual recognition support system 50 is provided with a near-infrared floodlight apparatus 52. This near-infrared floodlight apparatus 52 is lighting means for flooding an area in front of the vehicle with near-infrared light, and is controlled by signals received from the control portion 51. The near-infrared floodlight apparatus 52 is able to project near-infrared light in an illuminated area equivalent to that of Hi beams of headlights, for example.

The visual recognition support system 50 is also provided with a display portion 53. This display portion 53 is display means for displaying an image captured by the imaging device 1. The near-infrared floodlight apparatus 52 is mounted is a location such that the image is visible to the driver. Also, a set of switches 54 are provided to turn the visual recognition support system 50 ON and OFF and the like.

The visual recognition support system 50 is used when driving at night and other times such as when visibility is poor. The near-infrared floodlight apparatus 52 floods an area in front of the vehicle with near-infrared light. The imaging device 1, which is sensitive to the near-infrared region, then captures the area in front of the vehicle that is illuminated by the near-infrared light. The imaging device 1 then outputs a picture signal to the control portion 51. The control portion 51 then outputs the picture signal to the display portion 53 and the captured image based on the picture signal is then displayed on the display portion 53.

Having the captured image displayed when the near-infrared light is emitted helps the driver of the vehicle to recognize pedestrians and the like more easily than when looking ahead of the vehicle with the naked eye, and therefore supports the driver with respect to forward visual recognition. Also, because the light flooding out on that area is near-infrared light, there is little effect on drivers of oncoming vehicles.

However, in a case such as where there is an oncoming vehicle with its headlights on, the level of incoming light is extremely high. In this case, it is possible to reduce the halation in the displayed image that is based on the picture signal of the imaging device 1 by performing the output control (i.e., by controlling the output level of the picture signal), thereby making it possible to obtain suitable imaging and an appropriate image display.

Figure 6:
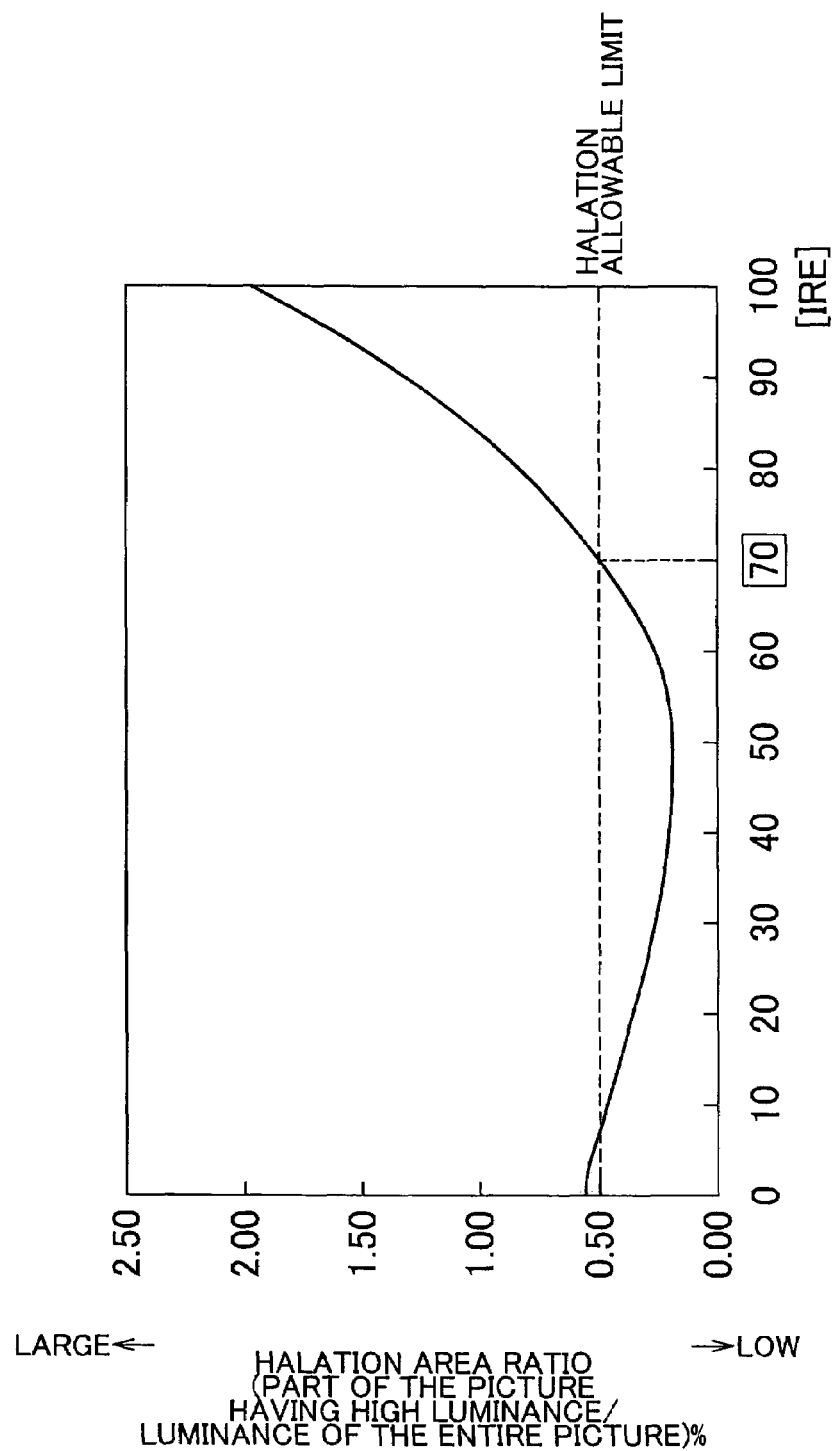
FIG. 6 is a graph showing an output adjustment value in the imaging device shown in FIG. 1 and a halation area ratio in a captured image.

FIG. 6 shows the relationship between the output adjustment value and the captured image.

In the drawing, the horizontal axis denotes the output adjustment value and the vertical axis denotes the halation area ratio in the captured image. The halation area ratio is calculated by dividing the luminance of the entire picture by a part of the picture that has high luminance.

As shown in the drawing, when the output adjustment value is set so as to gradually increase from 0 IRE, the halation area ratio gradually decreases until it reaches a low of 40 to 50 IRE. Then when the output adjustment value increases again, the halation area ratio suddenly starts to increase from around 70 IRE. Therefore, although an output adjustment of 10 to 70 IRE is sufficient when considering only halation reduction, a suitable captured image is not able to be obtained with low output adjustment when considering the visibility of pedestrians and the like.

FIGS. 7 to 10 are captured images when a predetermined output adjustment is performed by the imaging device 1.

Figure 7:
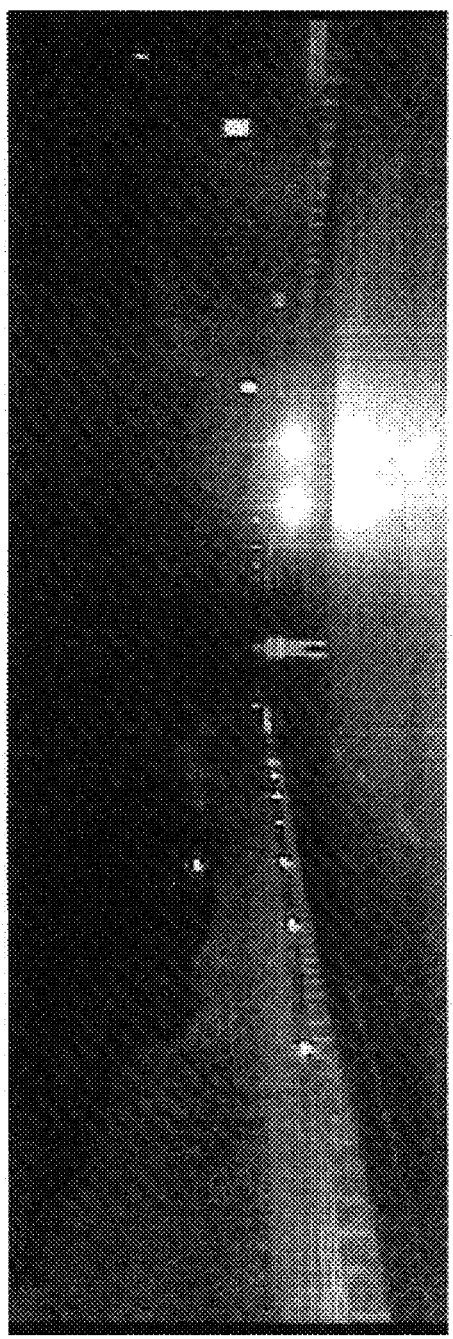
FIG. 7 is a captured image from a visual recognition support system shown in FIG. 5.
Figure 8:
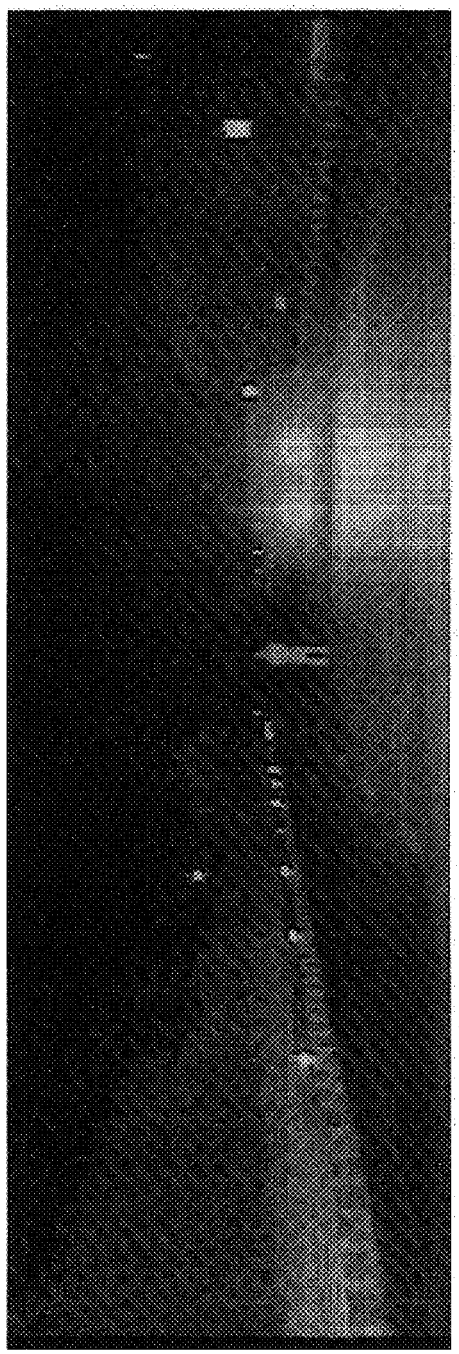
FIG. 8 is another captured image from the visual recognition support system shown in FIG. 5.
Figure 9:
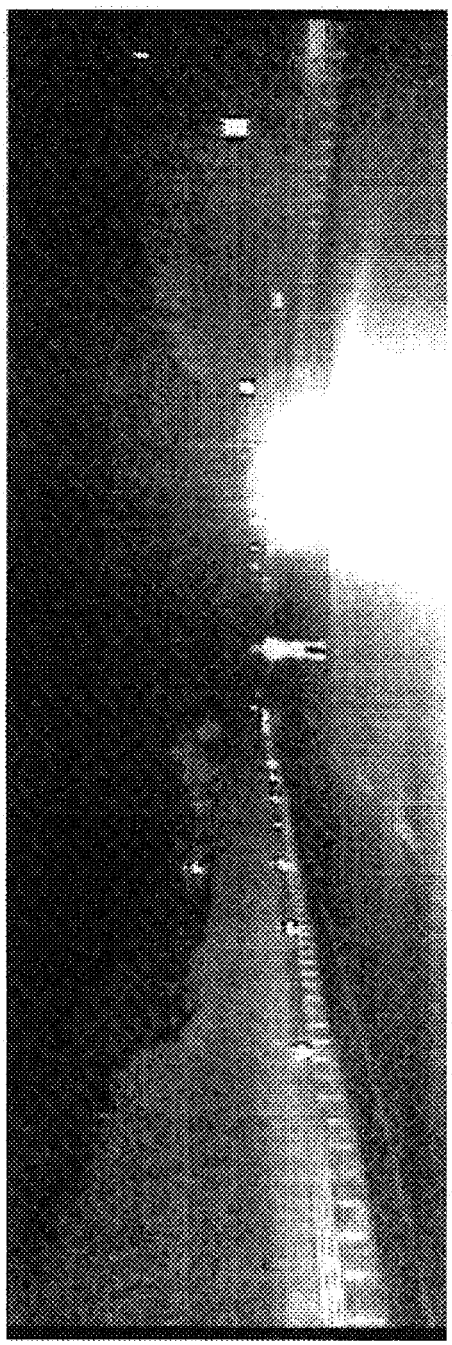
FIG. 9 is a still another captured image from the visual recognition support system shown in FIG. 5.
Figure 10:
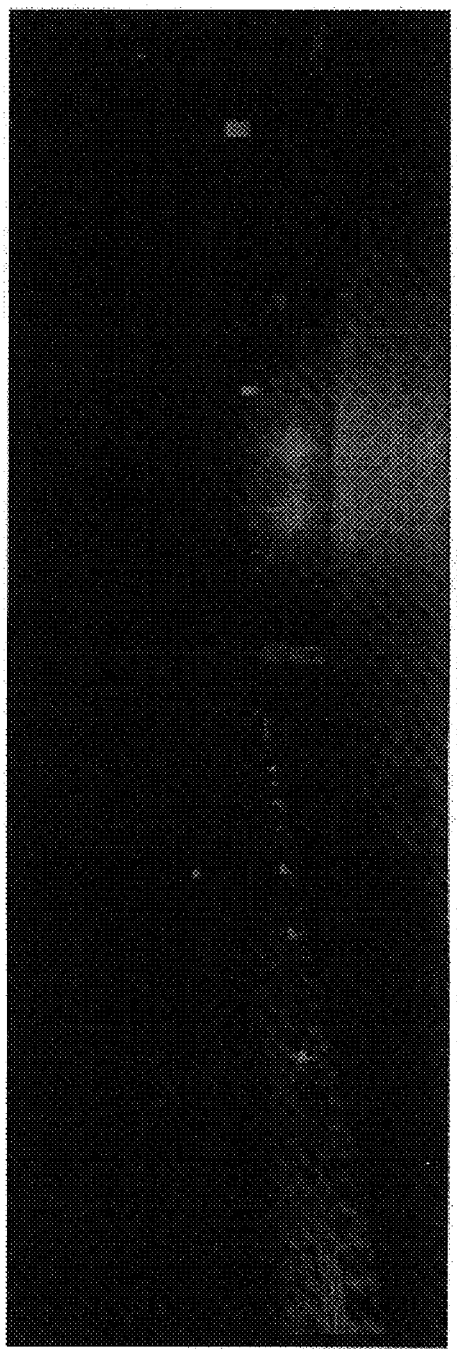
FIG. 10 is yet another captured image from the visual recognition support system shown in FIG. 5.

FIG. 7 is an image taken when the output adjustment value was 70 IRE. FIG. 8 is an image taken when the output adjustment value was 50 IRE. FIG. 9 is an image taken when the output adjustment value was 100 IRE. FIG. 10 is an image taken when the output adjustment value was 30 IRE. FIGS. 7 to 10 are images taken at night of a road on which there is a person and an oncoming vehicle with its headlights on, in the direction of travel of a vehicle equipped with the imaging device 1.

In the image taken with an output adjustment value of 70 IRE in FIG. 7, there is some halation of the headlights of the oncoming vehicle. However, the effect from that halation is not large and the person is clearly recognizable. In the image taken with an output adjustment value of 50 IRE in FIG. 8, the luminance of the image is low and the halation is reduced compared with FIG. 7. The person is still recognizable.

In the image taken with an output adjustment value of 100 IRE in FIG. 9, the effect from halation of the headlights of the oncoming vehicle is large and the luminance of the overall image is high. In the image taken with an output adjustment value of 30 IRE in FIG. 10, there is very little halation of the headlights, but the brightness of the image overall is reduced to the extent where the person is very difficult to recognize.

Accordingly, when the output adjustment value is 50 to 70 IRE (FIGS. 7 and 8), the effect from the halation of the headlights is reduced while sufficient visibility of pedestrians and the like is able to be ensured. On the other hand, when the output adjustment value is greater than 70 IRE (FIG. 9), the effect from the halation is large, and when the output adjustment value is less than 50 IRE (FIG. 10), visibility of the person is reduced such that it is difficult to obtain a suitable image display.

As described above, with the imaging device 1 according to this exemplary embodiment, the output of the peak value P of the picture signal S when the test pattern 20 is captured under the standard conditions is adjusted so as to be 50 to 70 IRE. As a result, even if the imaging conditions changes greatly, visibility of object of which an image is to be captured is able to be maintained while halation is able to be reduced, thus enabling suitable imaging and an appropriate image to be displayed.

In particular, the imaging device 1 is beneficial as imaging means for the visual recognition support system 50 when driving a vehicle at night where the imaging conditions changes greatly. That is, as imaging means for the visual recognition support system 50 when driving a vehicle at night where the imaging conditions changes greatly, the imaging device 1 enables suitable imaging as well as an appropriate image display to be obtained with the visual recognition support system 50, thereby improving the performance of the visual recognition support system 50.

In the first exemplary embodiment, a case was described in which the invention is applied to the visual recognition support system 50 which provides visual recognition support to the driver when driving a vehicle at night. The imaging device according to the invention is not limited to this, however, but may also be used on other systems and the like.

Second Exemplary Embodiment

Next, an imaging device according to a second exemplary embodiment of the invention will be described.

Figure 11:
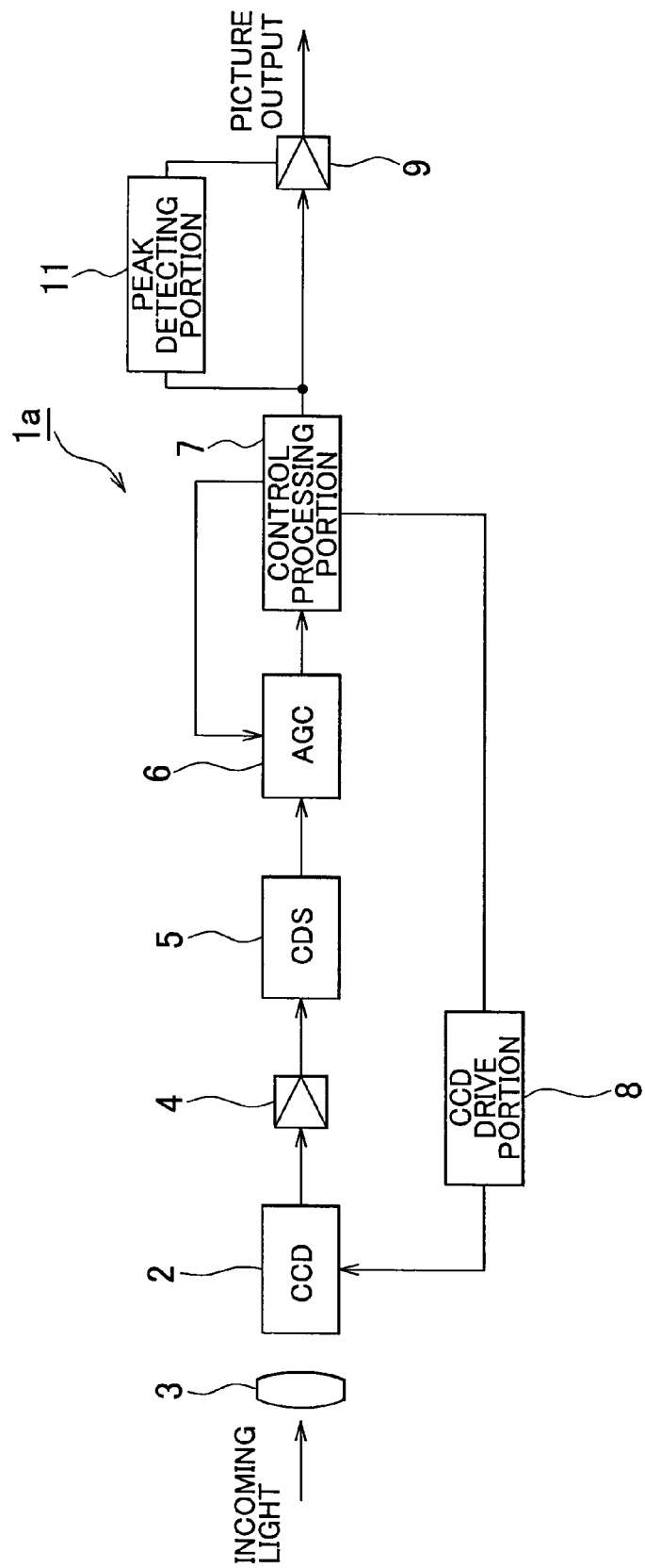
FIG. 11 is a block diagram of an imaging device according to a second exemplary embodiment of the invention.

FIG. 11 is a block view schematically showing main portions of an imaging device 1a according to the second exemplary embodiment. As shown in the drawing, the imaging device 1a according to this exemplary embodiment is configured substantially the same as the imaging device 1 according to the first exemplary embodiment, with the exception that the imaging device 1a according to the second exemplary embodiment is provided with a peak detecting portion 11.

This peak detecting portion 11 detects the peak value of a signal wave of the picture signal output from the control processing portion 7. When that peak value exceeds a predetermined value, the peak detecting portion 11 controls the output level of the picture signal such that the peak value of the picture signal matches the predetermined value. Preferably the predetermined value is set within a range of 50 to 70 IRE for the same reason as that given in the foregoing first exemplary embodiment.

Figure 12A:
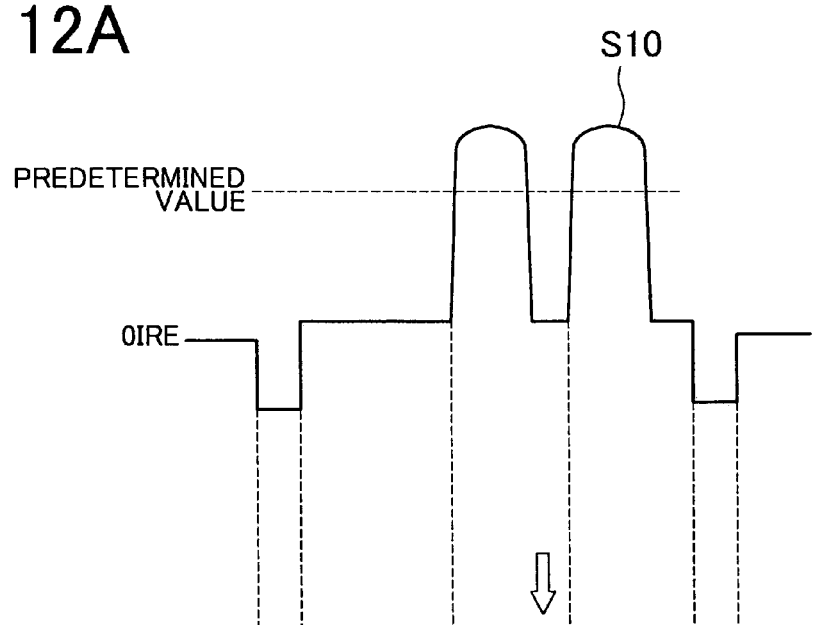
FIGS. 12A and 12B are views illustrating output control in the imaging device shown in FIG. 11.
Figure 12B:
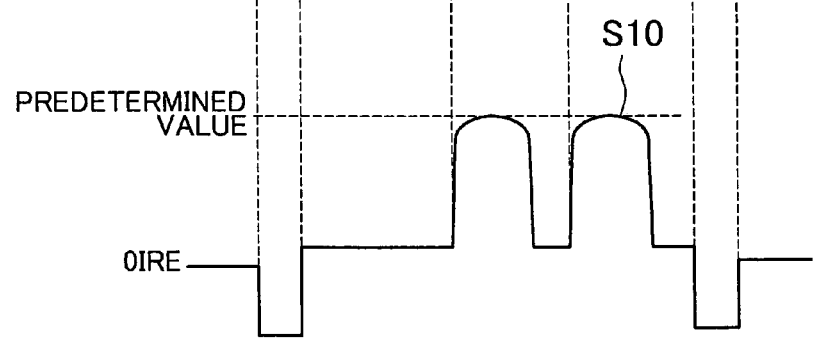

With the imaging device 1a according to this exemplary embodiment, when the incoming light is extremely strong such that a picture signal wave S10 exceeds the predetermined value, as shown in FIG. 12A, the gain of the amplifier 9 is adjusted and the output level of the picture signal is controlled such that the peak value of the picture signal wave S10 matches the predetermined value, as shown in FIG. 12B. As a result, the captured image of the imaging device 1a is prevented from being displayed brightly due to halation or the like so appropriate imaging is possible and an appropriate captured image can be displayed.

Also, similar to with the imaging device 1 according to the first exemplary embodiment, the imaging device 1a is beneficial as imaging means for the visual recognition support system 50 when driving a vehicle at night where the imaging conditions changes greatly.

As described above, in the imaging device 1a according to the second exemplary embodiment, when the peak value of the signal wave of the picture signal exceeds the predetermined value, the output level of the picture signal is controlled so that the peak value of the picture signal matches the predetermined value. As a result, it is possible to prevent the captured image from being displayed with excessive brightness when a strong incoming light is input. Accordingly, a captured image that is appropriate for the imaging conditions is able to be displayed.

Further, when the imaging device 1a according to the second exemplary embodiment is used as imaging means for the visual recognition support system 50, it is possible to prevent the captured image from being displayed with excessive brightness even if the imaging device 1a receives a strong light, such as the light from headlights of an oncoming vehicle. Therefore, it is possible to avoid a situation in which the display of the captured image interferes with driving of the vehicle.

In the second exemplary embodiment, a case was described in which the peak detecting portion 11 adjusts the output level of the picture signal so that the peak value detected by the peak detecting portion 11 matches a predetermined value. However, the output level of the picture signal may also be controlled so that the peak value matches the predetermined value using the average output level of the picture signals, without detecting the peak value. For example, output adjustment may be performed such that the peak value is kept within a range of 50 to 70 IRE under predetermined conditions, and the average output level of the picture signals can be obtained at that time. Then, by adjusting the output level of the picture signal so that the average output level of the picture signals matches that predetermined level during actual use with the obtained output level average as the predetermined level, the output level of the picture signal can be adjusted so that the peak value effectively matches the predetermined value. In this case, it is preferable that the predetermined condition be a condition of capturing the test pattern under standard conditions just as in the foregoing first exemplary embodiment.

Further, the same effect can be obtained when the predetermined value is a value having a predetermined width as when the predetermined value is a value at a certain point. For example, when a value having a width of 65±3 IRE is used as the predetermined value and the peak value of the picture signal exceeds 68 IRE, it is sufficient to adjust the output such that the peak value of the picture signal is at most 68 IRE. Similarly, when the peak value of the picture signal is less than 62 IRE with the same value width, it is sufficient to adjust the output such that the peak value of the picture signal is at least 62 IRE. Accordingly, it is possible to both prevent hunting in the control and display an image with superior visibility.

Third Exemplary Embodiment

Next, a third exemplary embodiment of the invention will be described.

Figure 13:
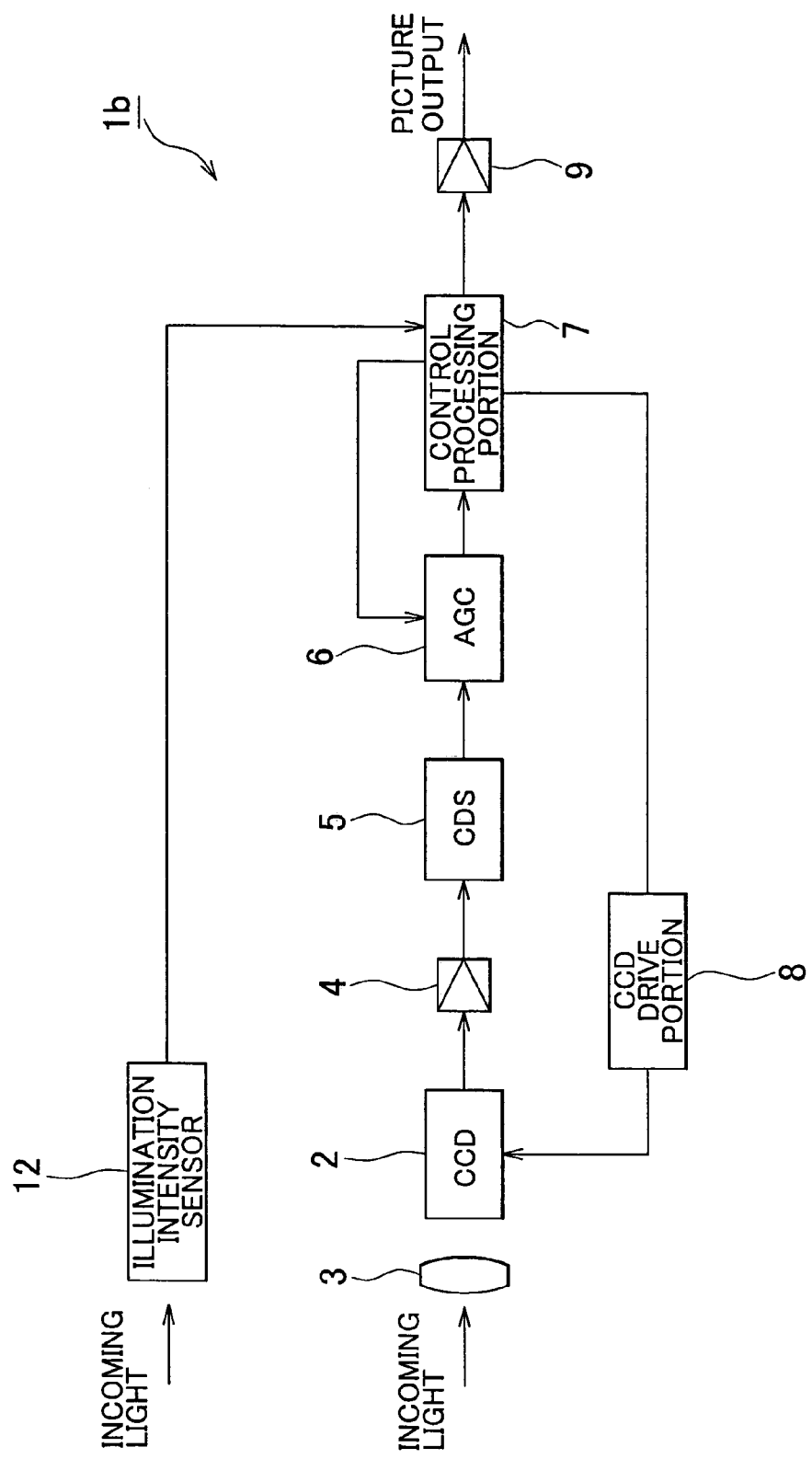
FIG. 13 is a block diagram of an imaging device according to a third exemplary embodiment of the invention.

FIG. 13 is a block diagram schematically showing main portions of an imaging device 1b according to the third exemplary embodiment of the invention. As shown in the drawings, the imaging device 1b according to this exemplary embodiment is configured substantially the same as the imaging device 1 according to the first exemplary embodiment, with the exception that the imaging device 1b according to the third exemplary embodiment is provided with an illumination sensor 12 that detects illumination intensity of the incoming light.

The illumination sensor 12 is arranged so that it can receive the incoming light, which is the object to be captured by the CCD 2, and serves as illumination detecting means for detecting the illumination intensity of that incoming light. The output of the illumination sensor 12 is input to the control processing portion 7. The control processing portion 7 changes the setting of a control target value appropriately based on the detection results of the illumination sensor 12, and controls the output level of the picture signal such that the brightness of the captured image is at least a predetermined value. A bias voltage value of the CCD 2, for example, can be used as the control target value. Also, an average luminance value of the entire display of the captured image, for example, may be used as the predetermined value for the brightness of the captured image. More specifically, it is preferable that the test pattern be captured under standard conditions similar to those described in the first exemplary embodiment, the output adjustment be performed such that the peak value of the picture signal becomes 50 to 70 IRE, and the average luminance value of the overall image at that time be used as the predetermined value for the brightness of the captured image.

Alternatively, the output of the illumination sensor 12 may be input into another controller, the parameter relating to the picture signal may be set appropriately by that other controller, and the parameter set in the control processing portion 7 may be changed.

Next, operation of the imaging device 1b according to the third exemplary embodiment will be described with an example in which the imaging device 1b is used as imaging means for the visual recognition support system 50.

When it has been determined that there is no bright light source, such as headlights from an oncoming vehicle, in the area of which an image is taken, the control target value is raised to brighten the captured image. In this case, pedestrians and a view of the road ahead are displayed brightly so that superior visibility is obtained.

On the other hand, when a strong light, such as the headlights of an oncoming vehicle, is input, the control target value is lowered to darken the captured image. Accordingly, it is possible to prevent the captured image from being displayed too brightly, thereby avoiding a situation in which the display of the captured image interferes with driving of the vehicle. Darkening the captured image also effectively prevents halation.

Further, when an extremely strong light, such as the Hi beams of headlights of an oncoming vehicle, are input, the control target value is lowered even more, thereby making the captured image even darker. Accordingly, visibility of pedestrians and the like is reduced, but it is possible to avoid the captured image from being displayed too brightly, thereby making it is possible to reliably avoid a situation in which the display of the captured image interferes with driving of the vehicle.

As described above, the imaging device 1b according to the third exemplary embodiment prevents the captured image from being displayed with excessive brightness by changing the control target value instantaneously when strong incoming light is input. The imaging device 1b does this by detecting the illumination intensity of incoming light using the illumination sensor 12, changing the control target value of the output level of the picture signal based on the detection results, and preventing the brightness of the captured image from the picture signal from becoming equal to, or higher than, a predetermined value. Accordingly, an image corresponding appropriately to the imaging conditions can be displayed.

Further, when the imaging device 1a according to the second exemplary embodiment is used as imaging means for the visual recognition support system 50, it is possible to prevent the captured image from being displayed with excessive brightness, even when the imaging device 1a receives strong light, such as light from headlights of an oncoming vehicle. Accordingly, it is possible to avoid a situation in which the display of the captured image interferes with driving of the vehicle.

In both the second and third exemplary embodiments, it is preferable to adjust the output such that the peak value when the test pattern is captured under standard conditions at the time of manufacture is kept within a range of 50 to 70 IRE as the default value, just as in the first exemplary embodiment. By adjusting the output in this way, the output level of the picture signal corresponding to the default value, i.e., the normal output level, matches the output level appropriate for nighttime imaging so the control width of the output level in the second and third exemplary embodiments can be made narrower.

What is claimed is:

1. An imaging device for a visual recognition support system that provides visual recognition support to a driver when driving a first vehicle at night, the imaging device comprising:
    an image pickup device which stores and photoelectric-converts incoming light from an object of which an image is to be captured and which is sensitive to a near-infrared light; and
    an output control device which controls an output level of a picture signal obtained by signal processing an image signal output from the image pickup device,
    wherein the output control device controls the output level of the picture signal output from the imaging device such that the peak value becomes 50 to 70 IRE when a predetermined test pattern is captured under a standard condition, so that an effect from the halation of headlights is reduced while sufficient visibility of pedestrians is ensured if there is a pedestrian and an oncoming, second vehicle with its headlight on in a captured image, and
    a final picture, based on the picture signal, having the peak value of 50 to 70 IRE, is displayed in the first vehicle.

2. The imaging device according to claim 1, wherein the output control device controls the output level of the picture signal by changing a light storage time of the image pickup device based on the image signal.

3. The imaging device according to claim 1, wherein the standard condition includes: 1) a chart light source apparatus that emits light having a color temperature of 5100±100° K, an illumination intensity of 2750±150 LUX, and a luminance of 1050±50 mt (cd/m2), and 2) a room lighting set between 500 to 1500 LUX.

4. The imaging device according to claim 1, wherein a grayscale chart is used for the test pattern.

5. The imaging device of claim 1, wherein the peak value of the picture signal is controlled to be about 65 IRE.

6. The imaging device of claim 5, wherein the peak value of the picture signal is controlled to be between ±3 IRE of 65 IRE.

7. An imaging device for a visual recognition support system that provides visual recognition support to a driver when driving a first vehicle at night, the imaging device comprising:

an image pickup device which stores and photoelectric-converts incoming light from an object of which an image is to be captured and which is sensitive to a near-infrared light; and an output control device which controls an output level of a picture signal obtained by signal processing an image signal output from the image pickup device, wherein when a peak value of a signal wave of the picture signal exceeds a predetermined value, the output control device controls the output level of the picture signal output from the imaging device such that the peak value becomes 50 to 70 IRE, so that an effect from the halation of headlights is reduced while sufficient visibility of pedestrians is ensured if there is a pedestrian and an oncoming, second vehicle with its headlight on in a captured image, and a final picture, based on the picture signal, having the peak value of 50 to 70 IRE, is displayed in the first vehicle.

8. The imaging device according to claim 7, wherein the output control device controls the output level of the picture signal by adjusting a gain of an amplifier that amplifies the picture signal.

9. The imaging device of claim 7, wherein the peak value of the picture signal is controlled to be about 65 IRE.

10. The imaging device of claim 9, wherein the peak value of the picture signal is controlled to be between ±3 IRE of 65 IRE.

11. An imaging device for a visual recognition support system that provides visual recognition support to a driver when driving a first vehicle at night, the imaging device comprising:

an image pickup device which stores and photoelectric-converts incoming light from an object of which an image is to be captured and which is sensitive to a near-infrared light; and output controlling means for controlling an output level of a picture signal obtained by signal processing an image signal output from the image pickup device, wherein the output controlling means controls the output level of the picture signal output from the imaging device such that the peak value becomes 50 to 70 IRE when a predetermined test pattern is captured under a standard condition, so that an effect from the halation of headlights is reduced while sufficient visibility of pedestrians is ensured if there is a pedestrian and an oncoming, second vehicle with its headlight on in a captured image, and a final picture, based on the picture signal, having the peak value of 50 to 70 IRE, is displayed in the first vehicle.

12. An imaging device for a visual recognition support system that provides visual recognition support to a driver when driving a first vehicle at night, the imaging device comprising:

an image pickup device which stores and photoelectric-converts incoming light from an object of which an image is to be captured and which is sensitive to a near-infrared light; and output controlling means for controlling an output level of a picture signal obtained by signal processing an image signal output from the image pickup device, wherein when a peak value of a signal wave of the picture signal exceeds a predetermined value, the output controlling means controls the output level of the picture signal output from the imaging device such that the peak value becomes 50 to 70 IRE, so that an effect from the halation of headlights is reduced while sufficient visibility of pedestrians is ensured if there is a pedestrian and an oncoming, second vehicle with its headlight on in a captured image, and a final picture, based on the picture signal, having the peak value of 50 to 70 IRE, is displayed in the first vehicle.

* * * * *